(12) United States Patent
Bruning et al.

(10) Patent No.: US 6,509,696 B2
(45) Date of Patent: Jan. 21, 2003

(54) METHOD AND SYSTEM FOR DRIVING A CAPACITIVELY COUPLED FLUORESCENT LAMP

(75) Inventors: Gert Bruning, Sleepy Hollow, NY (US); Chin Chang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/815,089

(22) Filed: Mar. 22, 2001

(65) Prior Publication Data

US 2002/0135319 A1 Sep. 26, 2002

(51) Int. Cl.⁷ ............................................... H05B 41/16
(52) U.S. Cl. .................................. 315/246; 315/DIG. 5; 315/209 R
(58) Field of Search .................................. 315/248, 224, 315/246, 58, 209 R, DIG. 5, DIG. 2, 221, 223

(56) References Cited

U.S. PATENT DOCUMENTS

| | | | |
|---|---|---|---|
| 5,059,868 A | 10/1991 | El-Hamamsy et al. | 315/248 |
| 5,095,249 A | 3/1992 | Roberts et al. | 315/248 |
| 5,381,073 A * | 1/1995 | Godyak et al. | 315/58 |
| 5,408,162 A | 4/1995 | Williams | 315/224 |
| 5,726,536 A | 3/1998 | Hagiwara | 315/276 |
| 5,811,933 A * | 9/1998 | Van Den Nieuwenhuizen et al. | 313/570 |
| 5,856,728 A | 1/1999 | Zimnicki et al. | 315/209 PZ |
| 5,923,129 A | 7/1999 | Henry | 315/307 |
| 5,936,358 A | 8/1999 | Okamoto et al. | 315/248 |
| 6,087,787 A | 7/2000 | Williams | 315/307 |
| 6,100,652 A | 8/2000 | Konopka | 315/291 |
| 6,107,733 A | 8/2000 | Jager | 313/496 |
| 6,181,071 B1 * | 1/2001 | Yuuki et al. | 315/169.3 |
| 6,281,637 B1 * | 8/2001 | Asada | 315/209 PZ |

* cited by examiner

*Primary Examiner*—Don Wong
*Assistant Examiner*—Tuyet T. Vo

(57) ABSTRACT

A capacitively coupled fluorescent lamp package having a capacitively coupled fluorescent lamp; an inverter circuit for driving the lamp; and supply nodes for receiving a supply voltage is disclosed. The capacitively coupled fluorescent lamp package includes a resonant circuit lamp driving scheme for driving the capacitively coupled fluorescent lamp. The driving scheme reduces parasitic capacitance leakage current; compensates the reactive power using the secondary side leakage inductance in order to have the resonant frequency approximately equal the inverter circuit operating frequency for current source-type driven circuits; and forms a series resonant sub-circuit with the embedded ballasting capacitor and the secondary side leakage inductance for voltage source-type driven circuits, such that the resonant frequency is substantially less than the inverter circuit operating frequency and that the lamp current is properly shaped along with current ballasting.

15 Claims, 4 Drawing Sheets

METHOD AND SYSTEM FOR DRIVING A CAPACITIVELY COUPLED FLUORESCENT LAMP

BACKGROUND OF THE INVENTION

1. Technical Field

The present disclosure relates generally to lighting systems. More specifically, the present disclosure relates to a method and system for driving a capacitively coupled fluorescent lamp.

2. Background of the Related Art

Cold cathode fluorescent lamps (CCFL) are widely used to backlight liquid crystal displays (LCD) and for other applications. Different electronic drivers or inverter circuits, for example, current-fed push-pull, voltage-fed push-pull, active clamped Flyback, and voltage-fed half-bridge inverter circuits, have been designed to operate CCFL lamps in high operating frequencies. A typical frequency range is between 20 kHz and 100 kHz. In this way a high frequency voltage is applied in a discharge space within a discharge vessel or tube of the CCFL forming a discharge.

To increase the illuminance of the CCFL, the gas pressure of the rare gas which fills the discharge vessel or tube is increased. After increasing the gas pressure of the rare gas, the current required for discharge is not sufficient if the voltage applied to the CCFL and the high frequency of the voltage are not increased. Therefore, in order to increase the illuminance or lamp power of the CCFL, not only must the gas pressure of the rare gas be increased, but also the voltage and current applied to the CCFL. However, when the applied voltage is increased, there is the danger of discharge creeping on the outer surface of the discharge vessel which can lead to an insulation breakdown of the CCFL.

To overcome the disadvantages of conventional CCFLs, a capacitively coupled fluorescent lamp has been designed where the traditional cathodes (composed of two relatively heavy nickel-plated iron rectangular tabs forming a "V") are replaced by cylindrical ceramic tubes or capacitive coupling structures. Typically, the cylindrical ceramic tubes have an inner diameter of 2.5 mm, an outer diameter of 3.5 mm and a length of 10 mm. Such ceramic tubes with certain dielectric constant and geometry effectively form series capacitance with the positive column of the lamp. The capacitance is not dependent on frequency. With proper material selection and construction, such series capacitance could be designed for the benefit of the electronic driver.

Due to the improvement of the cathodes, the lamp current is increased dramatically, without having to increase the pressure of the filled gas and the voltage applied to the lamp. In fact, when compared to conventional CCFLs, to deliver the same lamp power, the voltage applied to the capacitively coupled fluorescent lamp is less than the voltage applied to conventional CCFLs.

Further, as an effect, the equivalent lamp impedance is greatly reduced. For example, in a preferred design for the capacitively coupled fluorescent lamp, the lamp voltage is 450 V and the lamp current is 20 mA at 50 kHz. Hence, the lamp impedance is approximately 22.5 kOhm compared with approximately 115 Kohm for conventional CCFLs. Therefore, the capacitively coupled fluorescent lamp overcomes the problems associated with the prior art and also offers several advantages over conventional CCFLs.

As indicated above, electronic drivers or inverter circuits are used to operate CCFLs. In the circuit of FIG. 1, the inverter circuit is of voltage-fed-half-bridge type structure with LC resonant tank. The resonant inductor is Lr. The resonant capacitor is formed by the equivalent shield parasitic capacitance and the equivalent output interwinding capacitance of the transformer T1. The CCFL is denoted by its equivalent resistance R1p. The ballast circuit is controlled by an IC.

A typical set of the CCFL structure parameters are: lamp voltage Vlamp≈690 V; lamp current Ilamp≈6 mA; and equivalent shield capacitance Ceq≈7 pF as shown in FIG. 2. Also, a set of circuit design values are: DC input voltage Vin≈12 V; resonant inductor Lr≈6.5 uH; and output transformer turns ratio N=200.

In the circuit shown by FIG. 1, it can be calculated that the lamp equivalent impedance is 115 kOhm in the nominal steady state. At 50 kHz operating frequency, the equivalent impedance of the shield capacitance is 454.7 kOhm. Such very comparable impedance leads to large parasitic capacitance leakage current through the shield with respect to the lamp current. The circuit power losses are then increased. More importantly, it is difficult to design a unified electronic driver for different type of monitors without brutal forced lamp current feedback control.

In most of designed LCD backlight inverters, the inverter circuit output impedance is limited by the circuit internal structure. To achieve lamp stability, the lamp should be properly ballasted. One ballasting scheme for the narrow diameter CCFL is by connecting a small capacitor Cb in series with the lamp as shown in FIG. 3.

The series capacitance as in FIG. 3 is naturally buried in the structure of the capacitively coupled fluorescent lamp. For the above described capacitively coupled fluorescent lamp, by using the series capacitance, the equivalent capacitance Cb is in the range of 1.1–1.4 nF. At an operating frequency of 50 kHz, the corresponding equivalent impedance is in the range of 2.89–2.27 kOhm. It is measured that the dynamic negative impedance of the capacitively coupled fluorescent lamp is in the range of 5.0–7.0 kOhm in steady state with a frequency range of 25–100 kHz.

Due to the high AC voltage across the lamp (~500 V) and the low input DC voltage (~12 V), in most LCD monitor applications, high voltage step up output transformer is inevitable. Such high turns ratio usually generates high leakage inductance on the secondary side of the output transformer, i.e., secondary side leakage inductance. When the inverter circuit is connected to the capacitively coupled fluorescent lamp, such leakage inductance naturally forms a series resonant sub-circuit with the ballasting capacitor Cb which usually adversely affects the operation of the capacitively coupled fluorescent lamp.

The lead value of the ballasting capacitor Cb is depending on the lamp type and operating frequencies. In some commercial prototypes, Cb is typically in the range of 15–68 pF. The disadvantage of this implementation is that the output transformer usually needs to be over designed, such that the reactive power could be transferred to the lamp/ballasting capacitor branch.

Accordingly, there is a need for providing a resonant circuit lamp driving scheme which depending on the inverter circuit type, is capable of choosing different operating points for driving the capacitively coupled fluorescent lamp in order to reduce the transformer size, inverter circuit losses and improve the lamp current waveform.

SUMMARY OF THE INVENTION

In accordance with the present disclosure, a method and system are provided for driving a capacitively coupled fluorescent lamp which obviates the problems associated with the prior art.

The method and system of the present disclosure provide a resonant circuit lamp driving scheme for driving the capacitively coupled fluorescent lamp which reduces parasitic capacitance leakage current and consequently reduce the inverter circuit losses; compensates the reactive power using the secondary side leakage inductance to have the resonant frequency approximately equal the inverter circuit operating frequency for current source-type driven circuits and consequently reduce the output transformer size, turns ratio and losses; and forms a series resonant sub-circuit with the embedded ballasting capacitor and the secondary side leakage inductance for voltage source-type driven circuits, such that the resonant frequency is substantially less than the inverter circuit operating frequency and the lamp current is properly shaped along with current ballasting, and consequently reduce the turns ratio of the output transformer.

The disclosed system includes a capacitively coupled fluorescent lamp having cylindrical ceramic tubes. The system further includes an electronic driver or inverter circuit for driving the lamp and supply nodes for receiving a supply voltage. The inverter circuit is a conventional inverter circuit, such as, for example, current-fed push-pull, voltage-fed push-pull, active clamped Flyback, and voltage-fed half-bridge inverter circuits, used in conventional CCFLs.

Specifically, the present disclosure provides a capacitively coupled fluorescent lamp package having a capacitively coupled fluorescent lamp; an inverter circuit for driving the lamp; and supply nodes for receiving a supply voltage. A ballast circuit controlled by an integrated circuit may be connected to the inverter circuit for properly ballasting the lamp.

The capacitively coupled fluorescent lamp package includes a resonant circuit lamp driving scheme for driving the capacitively coupled fluorescent lamp. The driving scheme reduces parasitic capacitance leakage current; compensates the reactive power using the secondary side leakage inductance in order to have the resonant frequency approximately equal the inverter circuit operating frequency for current source-type driven circuits; and forms a series resonant sub-circuit with the embedded ballasting capacitor and the secondary side leakage inductance for voltage source-type driven circuits, such that the resonant frequency is substantially less than the inverter circuit operating frequency and the lamp current is properly shaped along with current ballasting.

DETAILED DESCRIPTION OF PREFERRED EMBODIMENTS

A preferred embodiment of the presently disclosed resonant circuit lamp driving scheme for driving a capacitively coupled fluorescent lamp within a capacitively coupled fluorescent lamp package will now be described in detail with reference to FIGS. 4 and 5. While the embodiment disclosed herein is designed for backlighting a liquid crystal display (LCD), the presently disclosed embodiment can be used in other applications.

Figure 4:
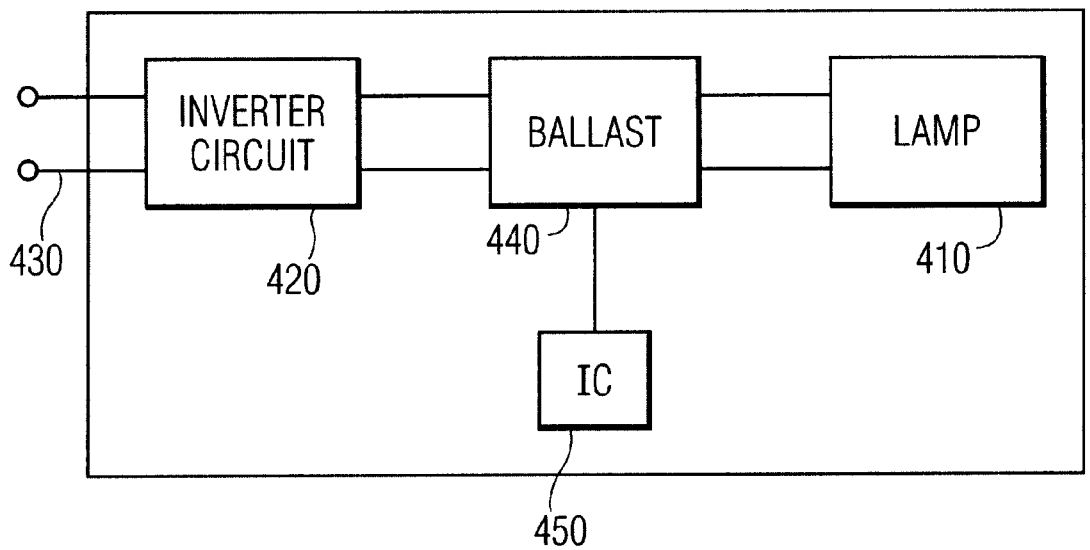
FIG. 4 is a block diagram of a capacitively coupled fluorescent lamp package having a lamp capable of being driven by a resonant circuit lamp driving scheme according to the present disclosure.
Figure 4A:
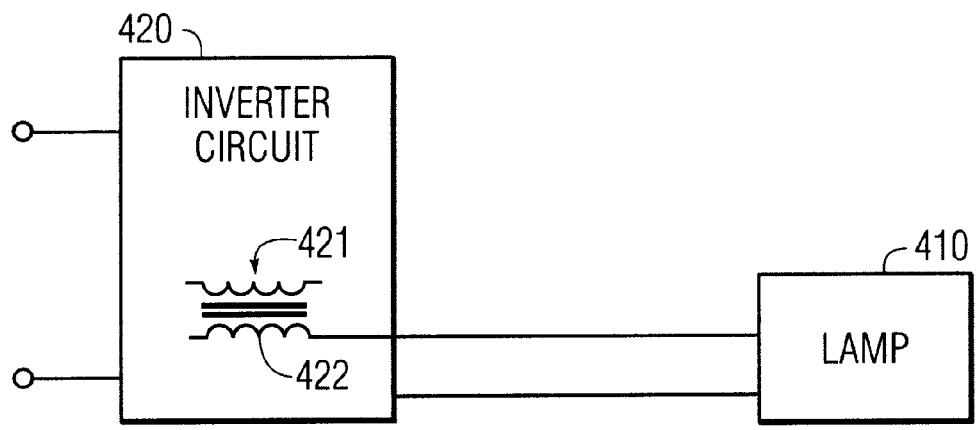
FIG. 4A is a block diagram of an alternative embodiment of FIG. 4 showing a current type driven inverter circuit.
Figure 5:
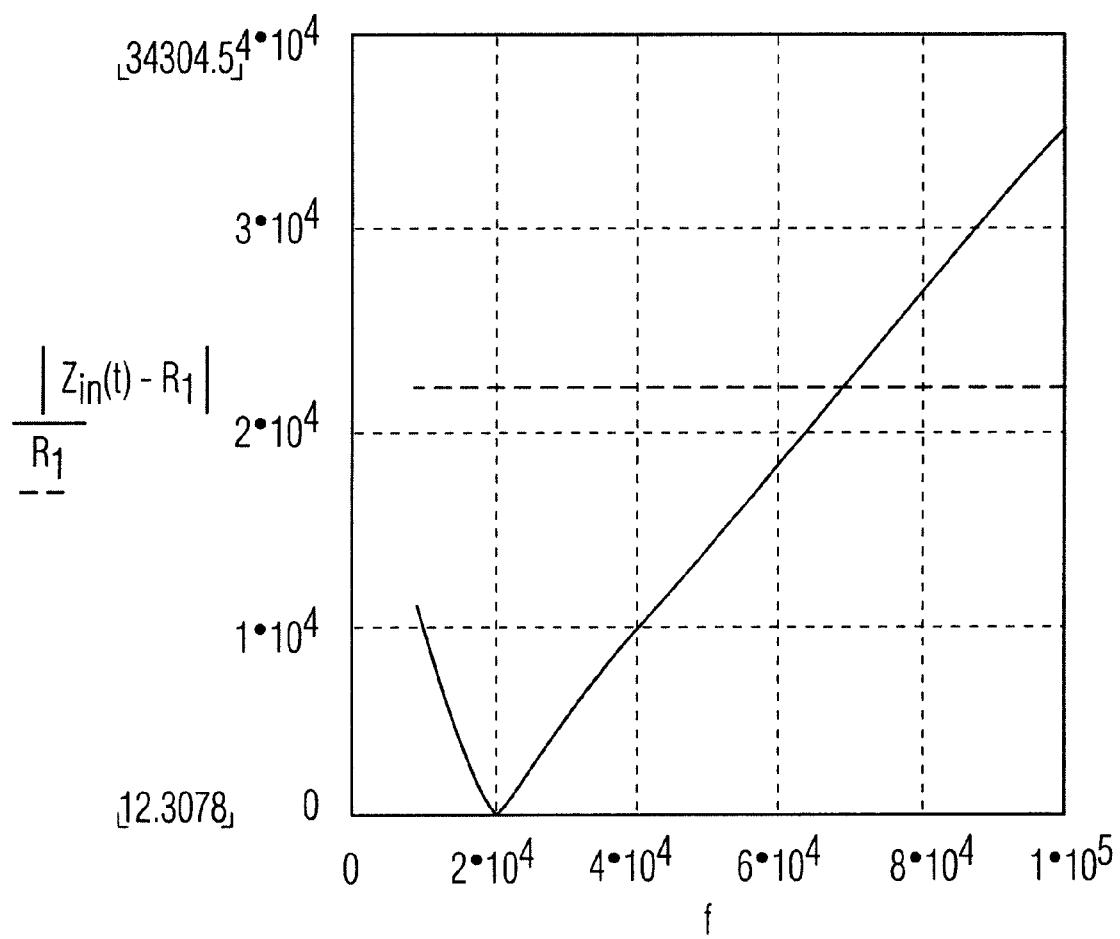
FIG. 5 is a chart illustrating an operating frequency range for an inverter circuit of the capacitively coupled fluorescent lamp package according to the resonant circuit lamp driving scheme according to the present disclosure.

With reference to FIG. 4, there is shown a block diagram of a capacitively coupled fluorescent lamp package utilizing the resonant circuit lamp driving scheme according to the present disclosure. The capacitively coupled fluorescent lamp package designated generally by reference numeral 400 includes a capacitively coupled fluorescent lamp 410 having a discharge vessel and cylindrical ceramic tubes. The lamp package 400 further includes an electronic driver or inverter circuit 420 for driving the lamp 410 and supply nodes 430 for receiving a supply voltage from a voltage or power supply (not shown). The supply voltage is approximately 450 V.

Preferably, the inverter circuit 420 supplies a 20 kHz and 100 kHz driving signal to the capacitively coupled fluorescent lamp 410. The 20 kHz driving signal is supplied, as described below, when the inverter circuit 420 is a current source driven type inverter circuit. The 100 kHz driving signal is supplied, as described below, when the inverter circuit 420 is a voltage source driven type inverter circuit.

The inverter circuit 420 is a conventional inverter circuit, such as, for example, current-fed push-pull, voltage-fed push-pull, active clamped Flyback, and voltage-fed half-bridge inverter circuits, used in conventional CCFLs. According to the present disclosure, depending on the inverter circuit type, different operating point should be chosen in order to reduce the transformer size, inverter circuit 420 losses and improve the lamp current waveform.

In current source driven type inverter circuits, the output impedance of the inverter circuit is usually very high. Direct lamp driving is possible. In this case, the output transformer 421 secondary side 422 leakage inductance and the coupling capacitance of the capacitively coupled fluorescent lamp 410 is designed to have the resonant frequency approximately equal the inverter circuit operating frequency.

In such a way, the coupling capacitance is completely compensated by the output transformer leakage inductance. In practice, even the resonant frequency does not match the inverter circuit operating frequency; their difference is kept as small as possible. The resonant circuit lamp driving scheme provides for keeping the inverter circuit operating frequency around the valley of the curve in FIG. 5, where the input impedance of the secondary side series resonant sub-circuit formed by the leakage inductance and the ballasting capacitor Cb is shown. Preferably, the operating frequency is 20 kHz.

In the case of voltage source driven type inverter circuits, the output impedance of the inverter circuit 420 is usually not high. Direct lamp driving usually leads to circuit instability. In this case, the output transformer secondary side leakage inductance and the coupling capacitance in the capacitively coupled fluorescent lamp 410 serves as second-order resonant sub-circuit for ballasting the capacitively coupled fluorescent lamp 410, as well as shaping the lamp current.

The resonant circuit lamp driving scheme provides for keeping the resonant frequency substantially below the inverter circuit operating frequency, i.e., the resonant frequency is less than the inverter circuit operating frequency. That is, the inverter circuit operating frequency range is substantially away from the valley of the curve in FIG. 5. Preferably, the operating frequency is 100 kHz. In such a way, the coupling capacitance is partially compensated by the output transformer leakage inductance.

In backlighting an LCD, the lamp package 400 is installed within a system having the LCD, such as a laptop computer, and the supply nodes 430 are connected to the voltage or power supply for providing a supply voltage. The inverter circuit 420 is then powered by the supply voltage. Accordingly, the inverter circuit 420 transmits drive signals using the resonant circuit lamp driving scheme according to the present disclosure to the capacitively coupled fluorescent lamp 410 causing the lamp 410 to achieve luminance for backlighting the LCD.

Figure 1:
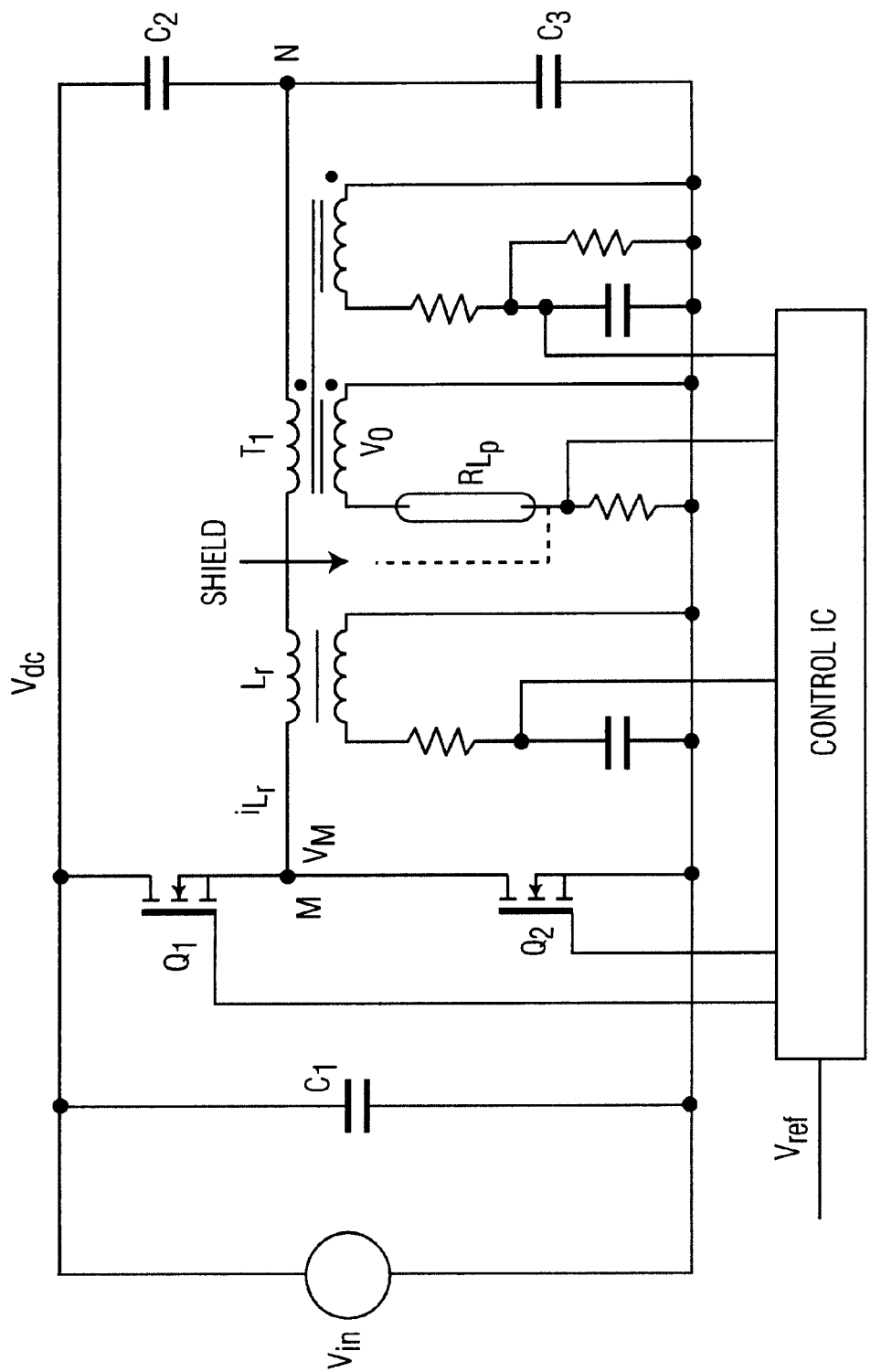
FIG. 1 is a schematic diagram of a prior art inverter circuit.
Figure 2:
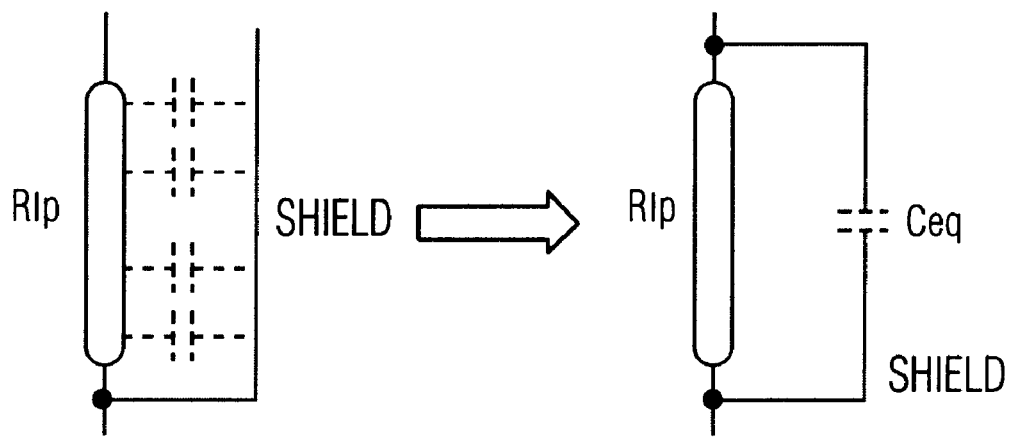
FIG. 2 is an equivalent diagram of a lamp/shield connection of the inverter circuit of FIG. 1.
Figure 3:
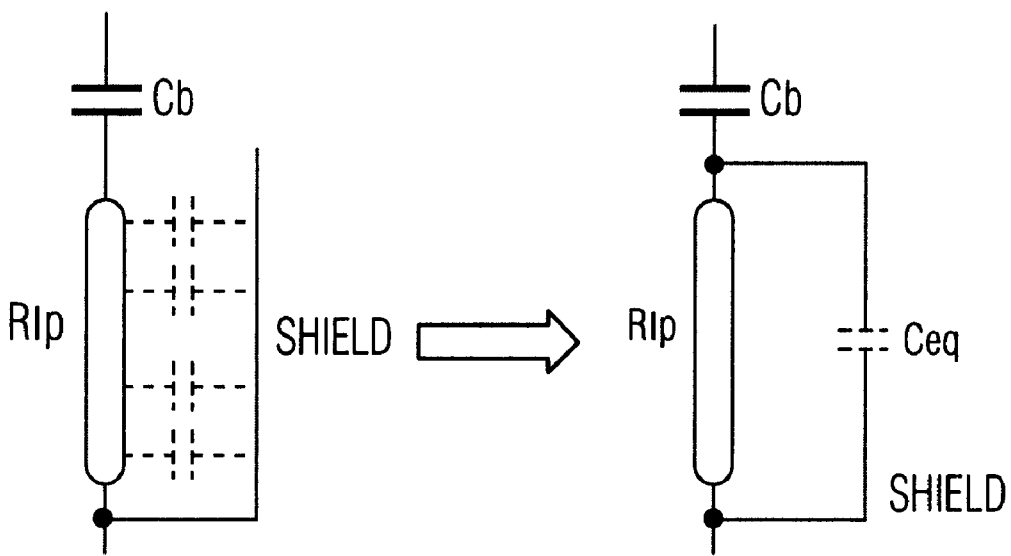
FIG. 3 is an equivalent diagram of a ballasting capacitor/lamp/shield connection of the inverter circuit of FIG. 1.

It is contemplated to also provide a housing for fully enclosing the lamp 410, the inverter circuit 420 and partially enclosing the supply nodes 430. It is also contemplated to provide a ballast circuit 440 for ballasting the capacitively coupled fluorescent lamp 410 and to provide an integrated circuit 450, for example as shown by FIG. 1, for controlling the ballast circuit.

Preferably, the inverter circuit 420 is selected from the group consisting of current-fed push-pull, voltage-fed push-pull, active clamped Flyback, and voltage-fed half-bridge inverter circuits.

It will be understood that various modifications may be made to the embodiments disclosed herein and that the above description should not be construed as limiting, but merely as exemplifications of preferred embodiments. Those skilled in the art will envision other modifications within the scope and spirit of the claims appended hereto.

What is claimed is:

1. A capacitively coupled fluorescent lamp package comprising:
   a capacitively coupled fluorescent lamp;
   an inverter circuit configured for driving the lamp at a first operating frequency which compensates for coupling capacitance of the lamp when the inverter circuit is a current source driven type inverter circuit, and for driving the lamp at a second operating frequency, substantially higher than said first operating frequency, which compensates for coupling capacitance of the lamp when the inverter circuit is a voltage source driven type inverter circuit; and
   supply nodes for receiving a supply voltage.

2. The lamp package according to claim 1, wherein the supply voltage is approximately 450 V.

3. The lamp package according to claim 1, wherein the capacitively coupled fluorescent lamp has a lamp current of approximately 20 mA and an operating frequency of approximately 50 kHz.

4. The lamp package according to claim 1, wherein the capacitively coupled fluorescent lamp has a lamp impedance of approximately 22.5 kOhm.

5. The lamp package according to claim 1, further comprising a ballast circuit for ballasting the capacitively coupled fluorescent lamp.

6. The lamp package according to claim 1, further comprising an integrated circuit for controlling the ballast circuit.

7. The lamp package according to claim 1, wherein the inverter circuit is configured for driving the lamp at an approximate operating frequency of 20 kHz or 100 kHz.

8. The lamp package according to claim 7, wherein the inverter circuit drives the lamp at the approximate operating frequency of 20 kHz if the inverter circuit is a current source driven type inverter circuit and the inverter circuit drives the lamp at the approximate operating frequency of 100 kHz if the inverter circuit is a voltage source driven type inverter circuit.

9. A method for driving a capacitively coupled fluorescent lamp, the method comprising the steps of:
   providing an inverter circuit;
   determining a first operating frequency for driving the inverter circuit which compensates for coupling capacitance of the lamp when the inverter circuit is a current source driven type inverter circuit and a second operating frequency, substantially higher than said first operating frequency, for driving the inverter circuit which compensates for coupling capacitance of the lamp when the inverter circuit is a voltage source driven type inverter circuit; and
   driving the lamp using the inverter circuit at the determined operating frequency.

10. The method according to claim 9, further comprising the steps of:
    providing a ballast circuit for ballasting the capacitively coupled fluorescent lamp; and
    providing an integrated circuit for controlling the ballast circuit.

11. The method according to claim 9, further comprising the step of making a resonant frequency of the inverter circuit approximately equal to the determined operating frequency of the inverter circuit.

12. The method according to claim 9, further comprising the step of making a resonant frequency of the inverter circuit less than the determined operating frequency of the inverter circuit.

13. The method according to claim 9, wherein the driving step includes the step of compensating for the coupling capacitance of the lamp using an output transformer leakage inductance.

14. The method according to claim 9, wherein the determining step determines whether to drive the lamp at an approximate operating frequency of 20 kHz or at an approximate operating frequency of 100 kHz.

15. The method according to claim 14, wherein determining step determines to drive the lamp at the approximate operating frequency of 20 kHz if the inverter circuit is a current source driven type inverter circuit and at the approximate operating frequency of 100 kHz if the inverter circuit is a voltage source driven type inverter circuit.

* * * * *